US010943067B1

United States Patent
Brown et al.

(10) Patent No.: US 10,943,067 B1
(45) Date of Patent: Mar. 9, 2021

(54) DEFEATING HOMOGRAPH ATTACKS USING TEXT RECOGNITION

(71) Applicant: Amazon Technologies, Inc., Seattle, WA (US)

(72) Inventors: Aaron Michael Brown, Seattle, WA (US); Mark David Contois, Boston, MA (US); David Ruysser Gabler, Atascadero, CA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 15/962,376

(22) Filed: Apr. 25, 2018

(51) Int. Cl.
*G06F 40/279* (2020.01)
*G06K 9/00* (2006.01)
*G06F 40/263* (2020.01)

(52) U.S. Cl.
CPC .......... *G06F 40/279* (2020.01); *G06F 40/263* (2020.01); *G06K 9/00463* (2013.01); *G06K 2209/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,869,269 B1* | 10/2014 | Ramzan | ............. | H04L 63/1483 709/206 |
| 9,141,607 B1* | 9/2015 | Lee | ......................... | G06F 40/58 |
| 10,127,388 B1* | 11/2018 | Popuveniuc | ............ | G06F 21/60 |
| 10,679,088 B1* | 6/2020 | Dalal | .................. | H04L 61/1511 |
| 10,785,260 B2* | 9/2020 | Schnieders | ......... | H04L 63/1483 |
| 2008/0031490 A1* | 2/2008 | Kobayashi | ........... | G06K 9/3258 382/101 |
| 2008/0172741 A1* | 7/2008 | Reumann | ............ | H04L 63/1483 726/23 |
| 2009/0259745 A1* | 10/2009 | Lee | ......................... | H04L 43/08 709/224 |
| 2014/0101259 A1* | 4/2014 | Barone | ................... | G06Q 50/10 709/206 |
| 2014/0155022 A1* | 6/2014 | Kandregula | ........... | G06Q 50/01 455/405 |
| 2015/0156210 A1* | 6/2015 | Hunt | .................... | H04L 63/1408 726/23 |
| 2016/0342838 A1* | 11/2016 | Shah | ................... | G06K 9/00671 |
| 2019/0050559 A1* | 2/2019 | McCarty | ................. | G06F 21/55 |

\* cited by examiner

*Primary Examiner* — Zhiyu Lu
(74) *Attorney, Agent, or Firm* — Thomas | Horstemeyer, LLP

(57) ABSTRACT

Disclosed are various embodiments for detecting homograph attacks using text recognition. A first string of untrusted text is received. A second string is determined corresponding to what the first string of untrusted text appears to be in a particular language. The second string is determined to differ from the first string of untrusted text. One or more actions are implemented in response to determining that the second string differs from the first string of untrusted text.

20 Claims, 7 Drawing Sheets

DEFEATING HOMOGRAPH ATTACKS USING TEXT RECOGNITION

BACKGROUND

In computer typography, it is not uncommon for different characters to resemble each other, or be "homographs." For example, in a sans serif font, a lower case letter "L" may look identical to an upper case letter "I." However, in moving beyond the relatively small American Standard Code for Information Interchange (ASCII) character set to the internationalized Unicode character set with thousands of characters, the problem of character homographs is compounded.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
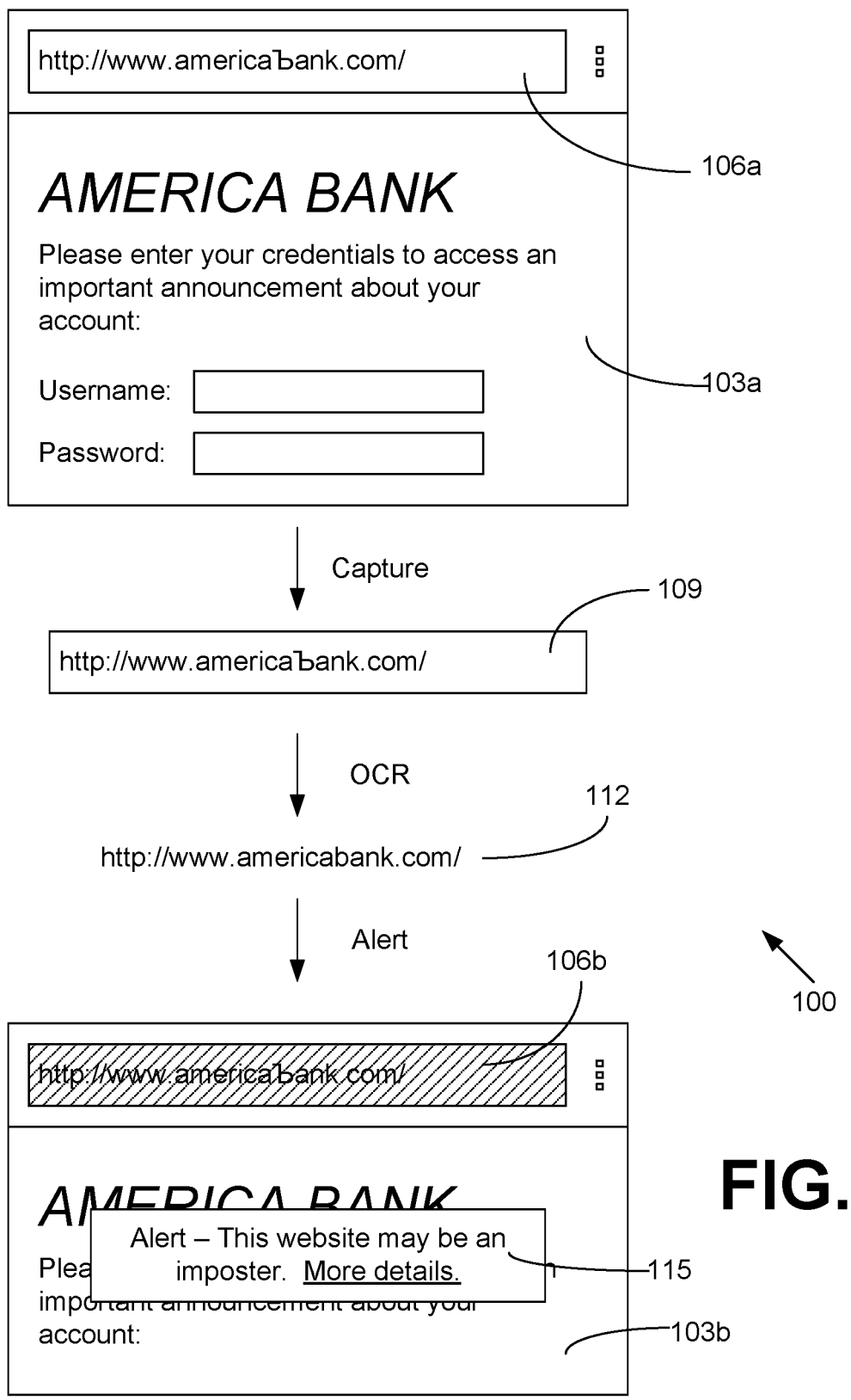
FIG. 1 is a drawing of an example scenario involving defeating a homograph attack in accordance with embodiments of the present disclosure.

The present disclosure relates to approaches for using text recognition to defeat homograph attacks. In the context of computer security, homograph attacks rely on similarities between characters in order to deceive victims into believing that one character string is actually another. In using character strings that appear similar to others, attackers are able to present a false identity and potentially manipulate victims into supplying security credentials, financial information, or other private information. This problem is particularly magnified in systems where character strings are registered with an authority and are trusted to be unique. Examples of such systems may include domain names, email usernames, screennames, social network accounts, mobile applications, and so on.

Although typical Latin character fonts may include homographs, the potential for homographs is greatly magnified in considering extended Unicode, with thousands of different characters for over a hundred different writing systems. For example, the lower case Greek letter omega may resemble the lower case Latin "w," and the Latin character "a" may look the same as the Cyrillic character "a." The problem of homographs is also magnified in that new fonts in other writing systems, such as Thai script, have recently been developed with characters stylized to resemble Latin characters, though homographs did not exist in the traditional typefaces.

In addition, readers of English may by accident ignore small accents or diacritical marks on Latin glyphs, which actually represent different characters from other languages. A variety of such diacritical marks exist (grave accents, acute accents, tildes, diereses, circumflex accents, cedillas, etc.). Furthermore, a diacritical mark, when combined with another character, may be misused to make one character look like another. For example, the Turkish alphabet includes a dot-less version of the lowercase Latin "i," and, in a homograph attack, this character may be combined with a diacritical character that adds a single dot above the dot-less "i." While domain names were formerly limited to ASCII characters, internationalized domain names can include extended Unicode characters, and internationalized domain names constitute a significant venue for homograph attacks.

Various embodiments of the present disclosure introduce approaches using text recognition in order to defeat homograph attacks. Text that is untrusted may be run through a text recognition process for a given language and/or locale to determine that the text appears to be for the given language and/or locale. In one embodiment, an image containing the text may be generated, and an optical character recognition (OCR) process may be performed on the image. The resulting text may be compared to the input text, and if the two differ, a homograph attack may be detected. This process may also be used for data sanitization, as the resulting text may be stored or used rather than the original untrusted text.

As one skilled in the art will appreciate in light of this disclosure, certain embodiments may be capable of achieving certain advantages, including some or all of the following: (1) improving computer security by enabling a computer to detect or intercept homograph attacks that would otherwise deceive human users, (2) enabling homograph attack recognition to be performed server-side, thereby reducing computational requirements for client devices, (3) enhancing user interfaces by providing elements that inform users when homograph attacks may be occurring, (4) sanitizing data corpuses to remove homographic data, thereby ensuring the integrity of the data corpus for use in machine learning, search engines, and so forth, and (5) improve computing efficiencies by, for example, reducing network and processing demands if a user realizes that he or she is on the wrong site and needs to navigate to another site, avoiding training a machine learning model with bad data and having to retrain the model, and so on. The additional elements in the user interfaces enable users to more efficiently locate, and navigate to, what they are looking for and allow the user to navigate to the associated pages with fewer clicks, taps, or other interactions.

With reference to FIG. 1, shown is an example scenario 100 involving defeating a homograph attack in accordance with embodiments of the present disclosure. A user has loaded a user interface 103a corresponding to a network page in a browser. For example, the user may have clicked on a link in an email address or another network page, or the browser may have been automatically redirected to the network page. The user interface 103a resembles a legitimate network site of a bank named "America Bank" and requests security credentials of the user. However, the network site is in fact operated by attackers and the user interface 103a corresponds to a phishing attack to gain security credentials.

Many users rely upon the address shown in the address bar 106a of the browser in order to determine whether the network site is legitimate. In this case, the attackers have employed a homograph attack in which the "b" in the domain name "americabank.com" has been replaced with a look-alike Cyrillic character. According to the present disclosure, an image 109 of the address bar 106b may be captured, and an optical character recognition (OCR) process performed. The resulting string 112 transforms the Cyrillic character into a normal Latin "b." Although FIG. 1 employs an example homographic character that is visibly distinguishable for the purposes of illustration, it is understood that homographic characters may be either visibly indistinguishable or visibly distinguishable.

Because the resulting string 112 differs from the original text from the address bar 106a, an alert 115 may be generated in the user interface 103b. One or more alert indicia may be presented, including altering the appearance of the address bar 106b to raise the attention of the user. A score may also be provided to help the user understand the relative risk of proceeding. The score can be a function of the differences between the original text and the homographic string, the volume of traffic to respective sites, when domain name system updates are made, scans of site content, and/or other factors. In the following discussion, a general description of the system and its components is provided, followed by a discussion of the operation of the same.

Figure 2:
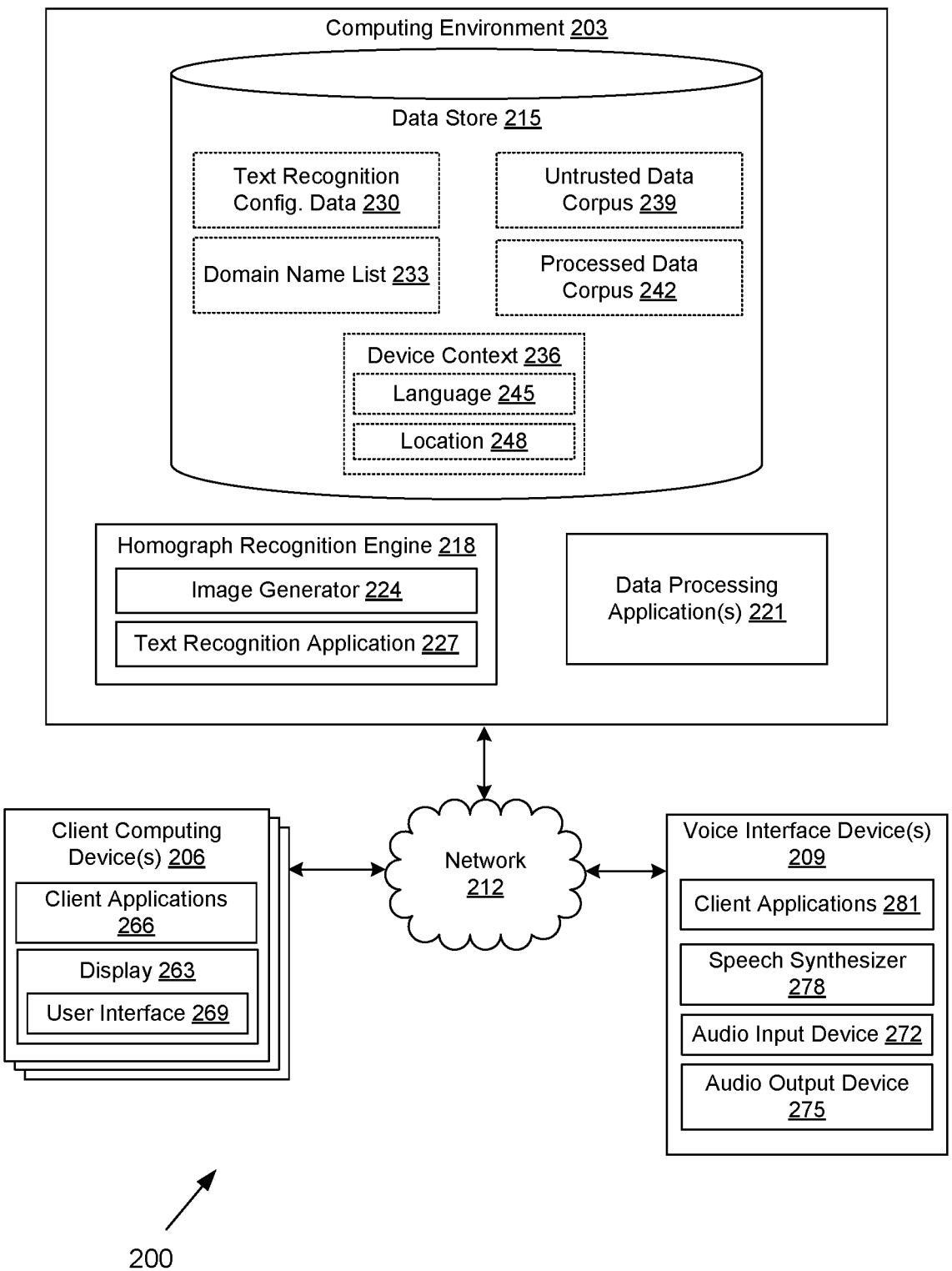
FIG. 2 is a schematic block diagram of a networked environment according to various embodiments of the present disclosure.

With reference to FIG. 2, shown is a networked environment 200 according to various embodiments. The networked environment 200 may include a computing environment 203, one or more client computing devices 206, and one or more voice interface devices 209, which may be in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include a homograph recognition engine 218, one or more data processing applications 221, and other applications, services, processes, systems, engines, or functionality not discussed in detail herein. The homograph recognition engine 218 is executed to receive text, perform a text recognition process on the text to determine whether it appears to be other text within a particular language, and then to initiate one or more actions on detected possible homographs. To this end, the homograph recognition engine 218 may include an image generator 224 and a text recognition application 227.

The image generator 224 is executed to generate an image that includes target text to be used as input to the text recognition application 227. The image generator 224 may use various parameters that are conducive to the text recognition application 227. For example, the font, text color, background color, text size, resolution, and so on, may be selected to be optimal for the text recognition application. The size and resolution may be selected to be minimal to reduce data size or processing time while not compromising accuracy of text recognition. Although the homograph recognition engine 218 may include an image generator 224, it is understood that in some embodiments, the homograph recognition engine 218 may receive previously generated images, which may be screen captures or portions of screen captures.

The text recognition application 227 is executed to perform an optical character recognition (OCR) process on an input image. Specifically, the text recognition application 227 examines the image and determines which characters or glyphs are present in the image. The text recognition application 227 thereby produces a character string of text obtained from recognizing the image. It is noteworthy that the text recognition application 227 may operate with respect to a particular language or locale. For example, the text recognition application 227 may operate differently when recognizing text that should be Latin characters corresponding to United States English as opposed to the Lao language used in Laos and written in Laotian script. Although the text recognition application 227 is described as performing OCR, in other implementations, the text recognition application 227 may simply examine input text to determine what it appears to be for a given language. In addition to replacing single character homographs, the text recognition application 227 may remove non-rendering spaces or non-rendering characters, as well as replace combining characters with their single character equivalents.

The data processing applications 221 are executed to perform a data processing function with respect to a data corpus. For example, a data processing application 221 may be training a machine learning model, indexing network pages for a search engine, performing plagiarism detection, sanitizing source code repositories, or performing other functions. The homograph recognition engine 218 may be used to sanitize the data corpus to remove homographic strings or to replace them with the strings that they appear to be before the data corpus is processed.

The data stored in the data store 215 includes, for example, text recognition configuration data 230, a domain name list 233, a device context 236, an untrusted data corpus 239, a processed data corpus 242, and potentially other data. The text recognition configuration data 230 includes configuration settings and other data to drive text recognition by the text recognition application 227. The text recognition configuration data 230 may include configuration data such as a set of glyphs correspond to possible characters in a selected language, a dictionary corresponding to words or terms in the selected language, possible punctuation in the selected language, and so forth.

The domain name list 233 may correspond to a list of popular domain names, which may be generated by a third-party entity. The domain name list 233 may be used in particular to flag homograph domain name attacks where the homograph domain name is determined to correspond to a popular domain name.

The device context 236 is used to control the operation of the homograph recognition engine 218 given a specified language 245 and/or location 248. The device context 236 may correspond to a context used by a client computing device 206 or a voice interface device 209. The device context 236 represents the language that the user is expecting to see by default when accessing data. The location 248 may be significant in that different locations may have differing dialects of a language 245 or use different characters than other locations. The combination of the language 245 and the location 248 may be understood as a locale.

The untrusted data corpus 239 includes data that is untrusted such that it may include homographic data that may cause problems when processed by the data processing application 221. The processed data corpus 242 corresponds to the result of the untrusted data corpus 239 being processed by the homograph recognition engine 218.

The client computing device 206 is representative of a plurality of client devices that may be coupled to the network 212. The client computing device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices 209, or other devices. The client computing device 206 may include a display 263. The display 263 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 206 may be configured to execute various applications such as a client application 266 and/or other applications. The client application 266 may be executed in a client computing device 206, for example, to access network content served up by the computing environment 203 and/or other servers, thereby rendering a user interface 269 on the display 263. To this end, the client application 266 may comprise, for example, a browser, a dedicated application, etc., and the user interface 269 may comprise a network page, an application screen, etc. The client computing device 206 may be configured to execute applications beyond the client application 266 such as, for example, email applications, social networking applications, word processors, spreadsheets, and/or other applications.

The voice interface device 209 is representative of a plurality of voice devices that may be coupled to the network 212. The voice interface device 209 may comprise, for example, a processor-based system such as a computer system. The voice interface device includes one or more audio input devices 272 and one or more audio output devices 275. The audio input devices 272 may comprise a microphone, a microphone-level audio input, a line-level audio input, or other types of input devices. The audio output device 275 may comprise a speaker, a speaker output, a headphone output, a line-level audio output, or other types of output devices. In one embodiment, the voice interface device 209 includes at least one integrated microphone and at least one integrated speaker, within a single enclosure.

The voice interface device 209 may also include a speech synthesizer 278 and one or more client applications 281. The speech synthesizer 278 may be configured to transform text inputs into speech for one or more languages using one or more standard voice profiles. The client applications 281 may enable functionality such as personal assistant functionality, home automation functionality, television control functionality, music playback functionality, and/or other interactive functions. The client applications 281 may be configured to perform natural language processing and/or speech to text functions.

Although the homograph recognition engine 218 is depicted in FIG. 2 as being executed in the computing environment 203, in various embodiments the homograph recognition engine 218, or portions thereof, may be executed in the client computing devices 206 or the voice interface devices 209.

Although many examples herein refer to homograph attacks with respect to the English language and the basic ASCII character set, it is understood that homograph attacks may be made targeting those who read other languages. As a non-limiting example, Thai script includes a character glyph that resembles a Latin "s," and an attacker may might substitute the Latin "s" for the expected Thai character to stage a homograph attack. For the purpose of recognizing such an attack, the language 245 should be set to the Thai language and script rather than the English language using the Latin script. Under such a configuration, the text recognition process would recognize the glyph as a Thai character rather than a Latin character.

Figure 3:
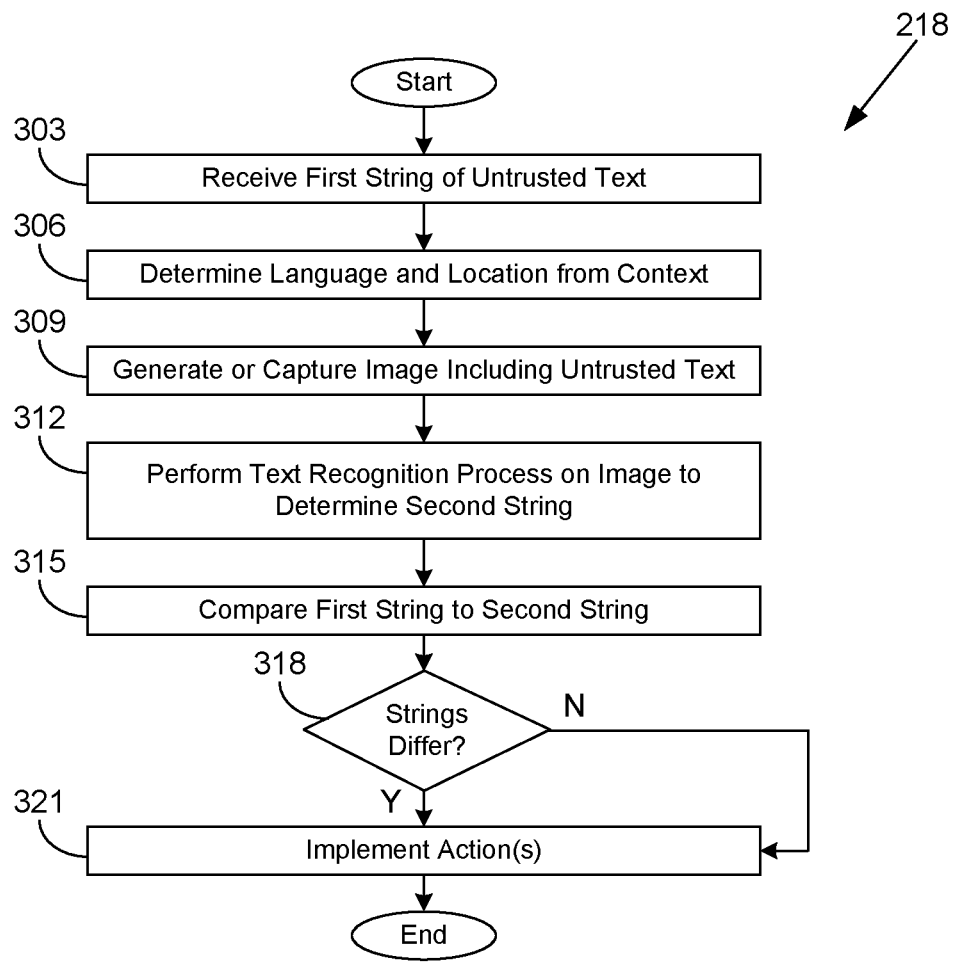
FIG. 3 is a flowchart illustrating one example of functionality implemented as portions of a homograph recognition engine executed in a computing environment in the networked environment of FIG. 2 according to various embodiments of the present disclosure.

Referring next to FIG. 3, shown is a flowchart that provides one example of the operation of a portion of the homograph recognition engine 218 according to various embodiments. It is understood that the flowchart of FIG. 3 provides merely an example of the many different types of functional arrangements that may be employed to implement the operation of the portion of the homograph recognition engine 218 as described herein. As an alternative, the flowchart of FIG. 3 may be viewed as depicting an example of elements of a method implemented in the computing environment 203 (FIG. 2) according to one or more embodiments.

Beginning with box 303, the homograph recognition engine 218 receives a first string of untrusted text. For example, the homograph recognition engine 218 may execute as a service, and the client computing device 206 (FIG. 2) may have submitted the untrusted text for homograph detection as a service. Alternatively, the homograph recognition engine 218 may execute on the client computing device 206 and intercept the untrusted text before or as it is being rendered for display by a client application 266 (FIG. 2).

In box 306, the homograph recognition engine 218 determines a language 245 (FIG. 2) and/or location 248 (FIG. 2) from a device context 236 (FIG. 2). The language 245 and/or location 248 indicate how a user is likely to perceive the text. For example, if the user is in the United States, the user may likely perceive the text as U.S. English. With some client computing devices 206, the language 245 and/or location 248 may be set by the operating system of the client computing device 206.

In box 309, the homograph recognition engine 218 generates, captures, or obtains an image that includes the untrusted text. For example, if the homograph recognition engine 218 is called as a service, the homograph recognition engine 218 may simply render the text in an image using a default font, text color, text size, resolution, etc., as would be most optimal for recognition, while minimizing resource consumption. Alternatively, the homograph recognition engine 218 may capture the image from a user interface 269 (FIG. 2) rendered on a display 263 (FIG. 2), or the homograph recognition engine 218 may receive a screen capture transmitted by a client computing device 206.

In box 312, the homograph recognition engine 218 uses the text recognition application 227 (FIG. 2) to perform a text recognition process on the image. The text recognition process is performed with reference to the language 245 and/or location 248 determined from the context. The text recognition process may include optical character recognition (OCR). While OCR of printed matter or real world images may not be fully accurate due to image artifacts or printing issues, it is noted that the text recognition process should be highly accurate in comparing the rendered text from the image to reference glyphs as controlled by the text recognition configuration data 230 (FIG. 2). The text recognition process results in selecting characters in the character set of the language 245 and/or location 248 rather than similar homographs from other character sets. Also, the text recognition process may strip out extraneous characters (e.g., non-printable spaces, non-printable characters, diacritical characters that combine with previous characters, etc.) and dead characters (e.g., characters that are no longer used, or that were mistakes in Unicode ab initio). In some cases, the text recognition process may strip out diacritical marks (e.g., removing an out-of-place accent in English words where they are not used).

In box 315, the homograph recognition engine 218 compares the first string of untrusted text that was received with the second string determined from the text recognition application 227. In box 318, the homograph recognition engine 218 determines whether the strings differ. In some implementations, particularly relating to data sanitization, the homograph recognition engine 218 may not determine whether the strings differ and simply use the second string determined from the text recognition application 227 in place of the first string. If the strings are the same, no homograph attack is detected, and the operation of the homograph recognition engine 218 ends.

However, if the strings differ, a homograph attack may be occurring, and the homograph recognition engine 218 implements one or more actions in box 321. For example, the homograph recognition engine 218 may cause an alert to be generated in a user interface 269 rendered by a client computing device 206. The homograph recognition engine 218 may cause the client application 266 to interrupt processing or block access to a resource associated with a possible homograph attack. Where the untrusted text corresponds to a domain name, the homograph recognition engine 218 may compare the recognized text with domain names in a domain name list 233 (FIG. 2), and indicate a possible homograph attack only if a match occurs. This is because attackers may be more likely to stage a homograph attack against a popular or frequently visited domain name than one that sees little network traffic. Thereafter, the operation of the portion of the homograph recognition engine 218 ends.

Figure 4:
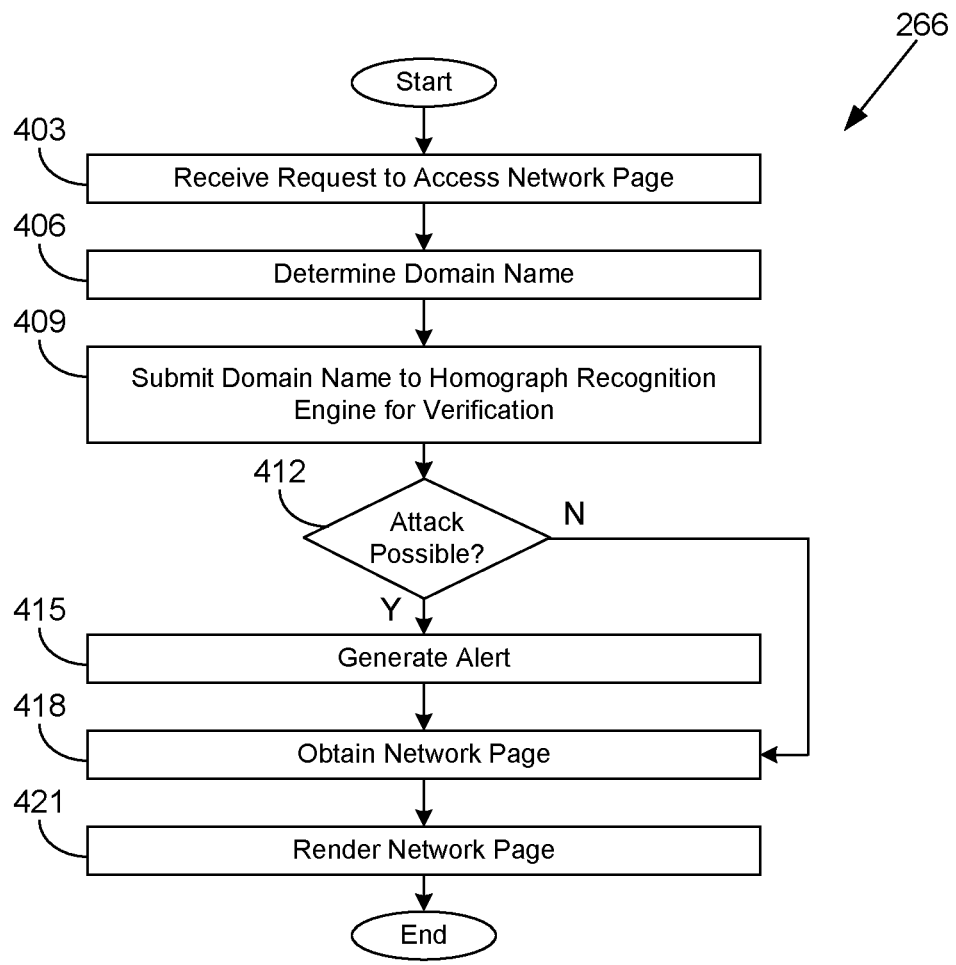
FIG. 4 is a flowchart illustrating one example of functionality implemented as portions of a client application executed in a client computing device in the networked environment of FIG. 2 according to various embodiments of the present disclosure.

Turning now to FIG. 4, shown is a flowchart that provides one example of the operation of a portion of the client application 266 according to various embodiments. It is understood that the flowchart of FIG. 4 provides merely an example of the many different types of functional arrangements that may be employed to implement the operation of the portion of the client application 266 as described herein. As an alternative, the flowchart of FIG. 4 may be viewed as depicting an example of elements of a method implemented in the client computing device 206 (FIG. 2) according to one or more embodiments.

Beginning with box 403, the client application 266 receives a request to access a network page. For example, a user may have clicked on a link to the network page, or another network page may contain code causing the network page to be accessed. In box 406, the client application 266 determines a domain name for the network page.

In box 409, the client application 266 submits the domain name to a homograph recognition engine 218 (FIG. 2) for verification. Submitting the domain name may include sending the domain name to the homograph recognition engine 218 along with an image of the domain name captured from the display 263 (FIG. 2). In some cases, an image of the domain name may be generated by the homograph recognition engine 218 and need not be submitted.

In various embodiments, the homograph recognition engine 218 may be executed in the client computing device 206 or may be operated as a service in the computing environment 203. In other embodiments, the verification may be performed by a homograph recognition engine 218 implemented in or called by a proxy server executed in the computing environment 203 that intercepts requests for network pages.

In box 412, the client application 266 determines whether the homograph recognition engine 218 indicates that a homograph attack is possible. If an attack is possible, the client application 266 moves to box 415 and generates an alert in the user interface 269 (FIG. 2). The client application 266 may block access to the network page and/or play a sound.

Subsequently, or if no homograph attack is detected, the client application 266 may obtain the network page in box 418. In box 421, the client application 266 may render the network page for display. However, if a homograph attack is detected, the actions of boxes 418 and 421 may be skipped. Thereafter, the operation of the operation of the client application 266 ends.

Although the example of FIG. 4 relates to client computing devices 206 with displays 263, a similar method may be implemented in a voice interface device 209 (FIG. 2) without a display 263. In such voice interface devices 209, the client application 281 (FIG. 2) may access a network page at a URL and read portions of the network page via a speech synthesizer 278 (FIG. 2) and an audio output device 275. If the URL contains homographic text or a homographic domain name in particular, as determined by the homograph recognition engine 218, the voice interface device 209 may announce an error to the user rather than to read out data from the network page at the URL.

Although the example of FIG. 4 relates to domain names in browser applications, the principles of FIG. 4 may also be applied to domain names in email addresses by email clients or mail servers. In addition, domain registrars may implement a similar verification procedure on domain names that are proposed for registration to compare the proposed names to homographic existing domains and/or homographic trademarks. Moreover, the principles of FIG. 4 may be applied to other strings beyond domain names that are registered or authoritatively unique, such as mobile application names, social network URLs, screennames, email address usernames, and so forth.

Figure 5:
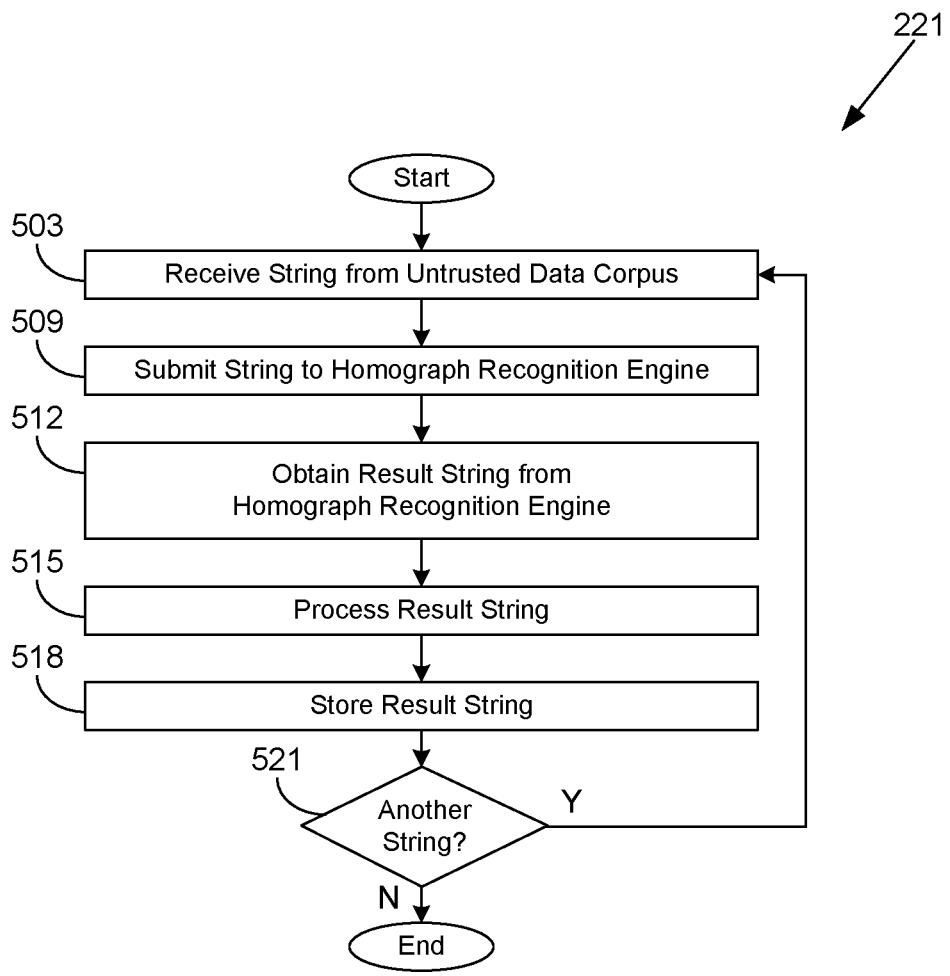
FIG. 5 is a flowchart illustrating one example of functionality implemented as portions of a data processing application executed in a computing environment in the networked environment of FIG. 2 according to various embodiments of the present disclosure.

Continuing to FIG. 5, shown is a flowchart that provides one example of the operation of a portion of the data processing application 221 according to various embodiments. It is understood that the flowchart of FIG. 5 provides merely an example of the many different types of functional arrangements that may be employed to implement the operation of the portion of the data processing application 221 as described herein. As an alternative, the flowchart of FIG. 5 may be viewed as depicting an example of elements of a method implemented in the computing environment 203 (FIG. 2) according to one or more embodiments.

Beginning with box 503, the data processing application 221 receives a string of untrusted text from an untrusted data corpus 239 (FIG. 2). In box 509, the data processing application 221 submits the string to the homograph recognition engine 218 (FIG. 2) for processing. This processing may result in removal of homographs from other scripts or languages, thus normalizing or sanitizing the string. Further, this processing may result in the removal of unused characters, zero-width spaces, or extraneous characters that merge into a single characters. In particular, this processing may remove steganographic data encoded into the non-rendering characters and zero-width spaces. The removal of such steganographic data may prevent data exfiltration from the computing environment 203. In some cases, if such steganographic data is detected (e.g., an abnormal quantity or pattern of non-rendering characters or zero-width spaces), the occurrence may be flagged for further review by a system administrator. In box 512, the data processing application 221 obtains a result string from the homograph recognition engine 218.

In box 515, the data processing application 221 may process the result string. As an example, the data processing application 221 may use the result string to train a machine learning model, thus defeating homograph attacks meant to poison machine learning training data sets. Homograph attacks may poison machine learning training sets by at least either consensus poisoning or combinatorial explosion. Consensus poisoning may involve reliably including hidden homographic strings in source documents, while combinatorial explosion reduces confidence in a trained model by ensuring that there are not reliable patterns in source materials.

As another example, the data processing application 221 may apply plagiarism detection to the result string. Homograph attacks may be used to avoid plagiarism detection engines, e.g., homographs in names, proper nouns, etc., which will already be flagged as misspelled. As still another example, the data processing application 221 may use the result string as part of indexing a network page for a search engine, where homographs are used to hide the true meaning of text to readers from the indexing algorithm.

As yet another example, the data processing application 221 may use the result string as part of sanitizing computer software source code, where malicious code may enter a code base or bypass code review through the use of homographs. For instance, a homographically named malicious class may be invoked without substantive review because it appears to be some other legitimate class. Even without external dependencies, homographs can be used to hide malicious behavior in plain sight. For instance, in a random on-call selector, a Unicode space may be utilized to generate a parsing error on a particular name, ensuring that the name will never be randomly selected.

As another example, the data processing application 221 may use the result string to bypass a homographic canary trap, where the same message is sent several times to several recipients with different homographs. As still another example, the data processing application 221 may use the result string to bypass a homograph bomb, where a string that appears only a few characters long is actually 500 megabytes in size. In box 518, the data processing application 221 may store the result string or the result of the processing in box 515 in the processed data corpus 242 (FIG. 2). In some cases, if a homograph is detected, the data processing application 221 may simply skip processing or storage of the string in question.

In box 521, the data processing application 221 determines whether another string remains to be processed in the untrusted data corpus 239. If so, the data processing application 221 returns to box 503 and receives the next string from the untrusted data corpus 239. If no other strings remain to be processed, the operation of the portion of the data processing application 221 ends.

Figure 6:
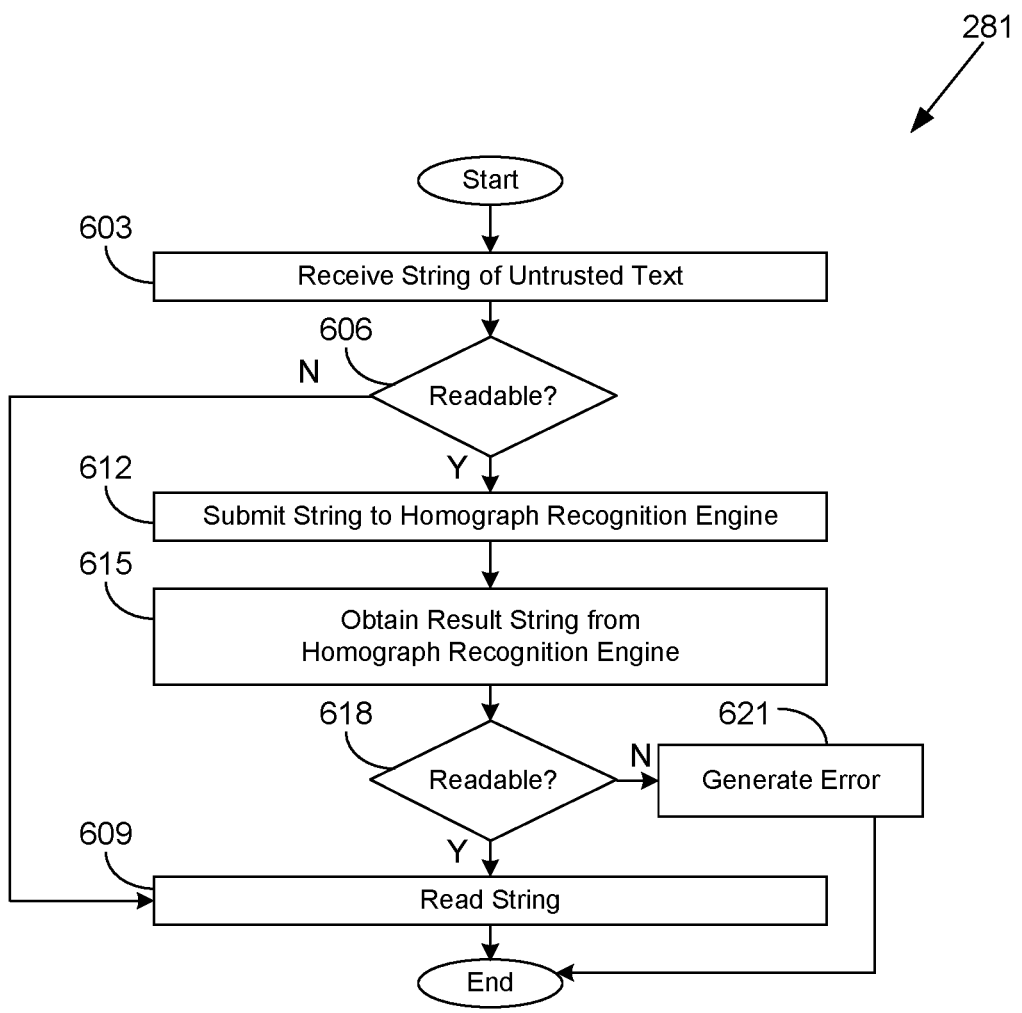
FIG. 6 is a flowchart illustrating one example of functionality implemented as portions of a client application executed in a voice interface device in the networked environment of FIG. 2 according to various embodiments of the present disclosure.

Referring next to FIG. 6, shown is a flowchart that provides one example of the operation of a portion of the client application 281 according to various embodiments. It is understood that the flowchart of FIG. 6 provides merely an example of the many different types of functional arrangements that may be employed to implement the operation of the portion of the client application 281 as described herein. As an alternative, the flowchart of FIG. 6 may be viewed as depicting an example of elements of a method implemented in the voice interface device 209 (FIG. 2) according to one or more embodiments.

Beginning with box 603, the client application 281 receives a string of untrusted text. In box 606, the client application 281 determines whether the string is readable by the speech synthesizer 278 (FIG. 2). For example, a homographic string that includes a look-alike character from a different character set may be unpronounceable. If the string is readable, the client application 281 moves to box 609 and reads the string via the speech synthesizer 278 and the audio output device 275 (FIG. 2). Thereafter, the operation of the portion of the client application 281 ends.

If the string is unreadable, the client application 281 moves from box 606 to box 612 and submits the string to the homograph recognition engine 218 (FIG. 2). In box 615, the client application 281 obtains a result string from the homograph recognition engine 218. In box 618, the client application 281 determines whether the result string is readable. If so, the client application 281 moves to box 609 and reads the result string via the speech synthesizer 278 and the audio output device 275. Thereafter, the operation of the portion of the client application 281 ends.

If the result string is still not readable, the client application 281 moves to box 621 and generates an error. For example, the client application 281 may cause a sentence such as "This text is unreadable" to be announced via the audio output device 275. Thereafter, the operation of the portion of the client application 281 ends.

Figure 7:
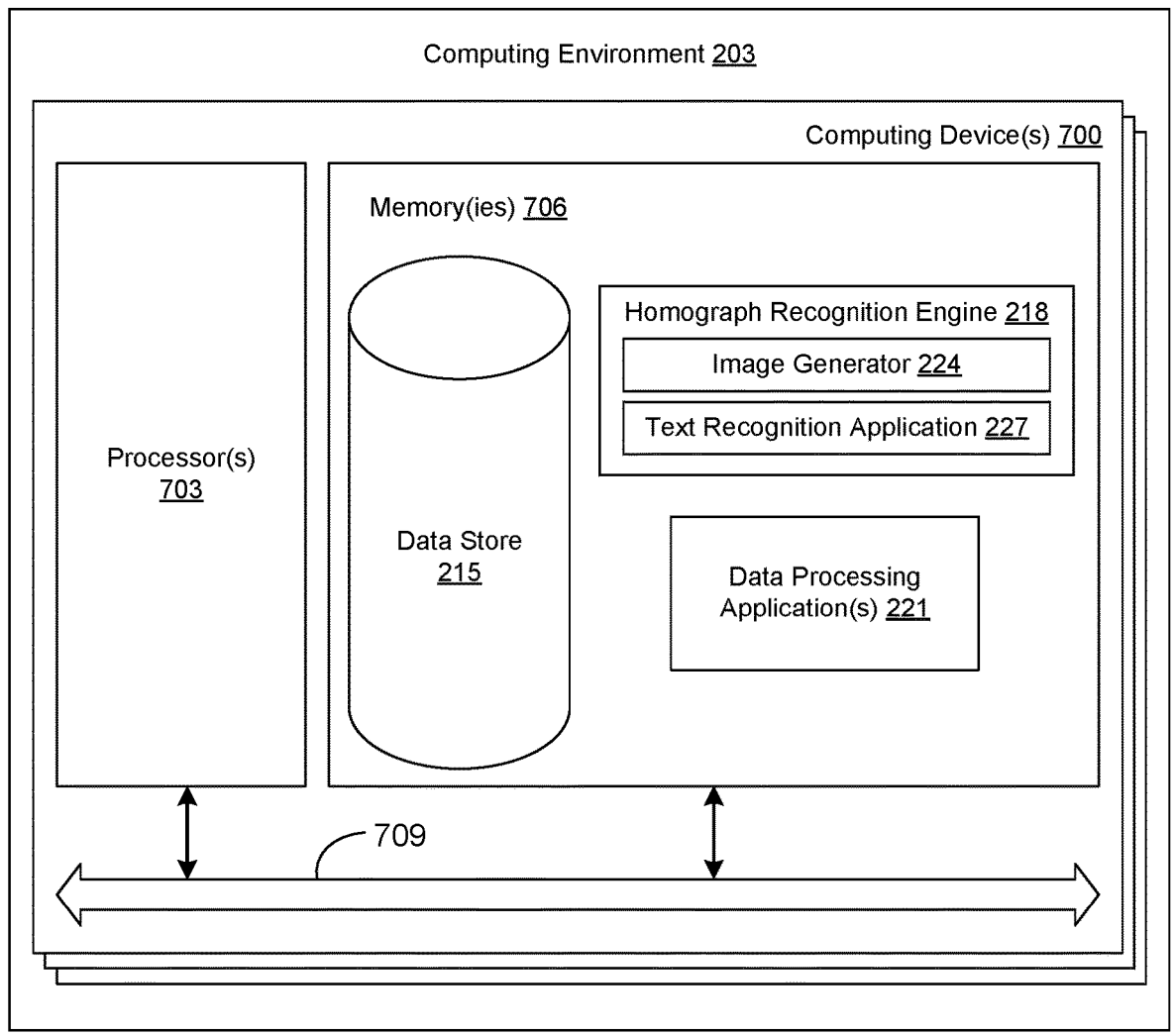
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are a homograph recognition engine 218, an image generator 224, a text recognition application 227, a data processing application 221, and potentially other applications. Also stored in the memory 706 may be a data store 215 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the homograph recognition engine 218, the image generator 224, the text recognition application 227, the data processing application 221, the client applications 266 and 281 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the homograph recognition engine 218, the data processing application 221, and the client applications 266 and 281. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the homograph recognition engine 218, the image generator 224, the text recognition application 227, the data processing application 221, and the client applications 266 and 281, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the homograph recognition engine 218, the image generator 224, the text recognition application 227, the data processing application 221, and the client applications 266 and 281, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   capture an image of at least a portion of a user interface including a domain name from a display of a client computing device, the image including a first string of untrusted text having one or more characters from a character set corresponding to a first language;
   determine a second language from associated with a locale in a device context of the client computing device, the second language differing from the first language;
   configure an optical character recognition (OCR) process to recognize the second language in response to determining the second language from the device context;
   determine a second string by performing the OCR process on the image, wherein the OCR process recognizes what the first string of untrusted text appears to be in the second language;
   determine that the second string corresponds to a particular domain name from a list of popular domain names;
   determine that the second string differs from the first string of untrusted text because at least one first character in the first language from the first string of untrusted text is incorrectly recognized by the OCR process as being at least one second character in the second language;
   cause processing of a resource by the client computing device to be interrupted or access to the resource to be blocked via the client computing device; and
   cause an alert to be rendered on the display.

2. The non-transitory computer-readable medium of claim 1, wherein the image is captured from an address bar of a browser.

3. The non-transitory computer-readable medium of claim 1, wherein the second string differs from the first string of untrusted text by at least one homographic Unicode character or at least one non-rendering Unicode character.

4. A system, comprising:
   at least one computing device; and
   a homograph recognition engine executable in the at least one computing device, wherein when executed the homograph recognition engine causes the at least one computing device to at least:
   receive an image including a first string of untrusted text having one or more characters from a character set corresponding to a first language, the image being captured from a display of a client computing device, the image showing at least a portion of a user interface that includes a domain name;
   determine a second language from associated with a locale in a device context of the client computing device, the second language differing from the first language;
   configure an optical character recognition (OCR) process to recognize the second language in response to determining the second language from the device context;
   determine a second string corresponding to what the first string of untrusted text appears to be in the second language by performing the OCR process on the image;
   determine that the second string differs from the first string of untrusted text because at least one first character in the first language from the first string of untrusted text is incorrectly recognized by the OCR process as being at least one second character in the second language; and implement at least one action in response to determining that the second string differs from the first string of untrusted text, the at least one action including at least one of: causing processing of a resource by the client computing device to be interrupted, or access to the resource to be blocked via the client computing device.

5. The system of claim 4, wherein when executed the homograph recognition engine further causes the at least one computing device to at least generate the image including the first string of untrusted text.

6. The system of claim 4, wherein when executed the homograph recognition engine further causes the at least one computing device to at least receive the image including the first string of untrusted text from a screen capture.

7. The system of claim 4, wherein when executed the homograph recognition engine further causes the at least one computing device to at least determine that the second string corresponds to a particular domain name from a list of domain names.

8. The system of claim 4, wherein the at least one action comprises causing a user interface element to be generated, the user interface element indicating an alert regarding the first string of untrusted text.

9. The system of claim 4, wherein the at least one action comprises causing the second string to be processed instead of the first string of untrusted text.

10. The system of claim 4, wherein the second string contains fewer characters than the first string of untrusted text.

11. A method, comprising:
  receiving, via at least one of one or more computing devices, an image including a first string of untrusted text having one or more characters from a character set corresponding to a first language, the image being captured from a display of a client computing device, the image showing at least a portion of a user interface that includes a domain name;
  determining, via at least one of the one or more computing devices, a second language from associated with a locale in a device context of the client computing device;
  configuring, via at least one of the one or more computing devices, an optical character recognition (OCR) process to recognize the second language in response to determining the second language from the device context;
  determining, via at least one of the one or more computing devices, a second string by performing the OCR process on the image; and
  implementing, via at least one of the one or more computing devices, at least one action relative to the second string instead of the first string of untrusted text because at least one first character in the first language from the first string of untrusted text is incorrectly recognized by the OCR process as being at least one second character in the second language, the at least one action including at least one of: causing processing of a resource by the client computing device to be interrupted, or access to the resource to be blocked via the client computing device.

12. The method of claim 11, further comprising determining, via at least one of the one or more computing devices, a particular region, wherein the OCR process is based at least in part on the particular region.

13. The method of claim 11, wherein receiving the image further comprises receiving, via at least one of the one or more computing devices, the image from a client device via a network.

14. The method of claim 11, wherein receiving the image further comprises intercepting a communication between a client device and a server via a network, the image being encoded in the communication.

15. The method of claim 11, wherein the at least one action further comprise storing, via at least one of the one or more computing devices, the second string in a data store instead of the first string of untrusted text.

16. The method of claim 11, wherein the at least one action further comprise providing, via at least one of the one or more computing devices, the second string to a machine learning model instead of the first string of untrusted text.

17. The method of claim 11, wherein the at least one action further comprise indexing, via at least one of the one or more computing devices, a network page based at least in part on the second string, the network page including the first string of untrusted text.

18. The method of claim 12, further comprising capturing, via at least one of the one or more computing devices, the image from an address bar of a browser.

19. The system of claim 4, wherein when executed the homograph recognition engine further causes the at least one computing device to at least determine a particular region from the device context, wherein the OCR process is based at least in part on the particular region.

20. The method of claim 11, wherein the second string contains fewer characters than the first string of untrusted text.

\* \* \* \* \*